US012680572B2

(12) United States Patent
Schrieber et al.

(10) Patent No.: US 12,680,572 B2
(45) Date of Patent: Jul. 14, 2026

(54) SPRING AND SOCKET JOINT

(71) Applicant: FEDERAL-MOGUL MOTORPARTS LLC, Southfield, MI (US)

(72) Inventors: Dustin Schrieber, Waterloo, IL (US); Seth Englebright, Festus, MO (US); Saugat Timilsina, Maryland Heights, MO (US); Roger Sellers, Arnold, MO (US)

(73) Assignee: FEDERAL-MOGUL MOTORPARTS LLC, Southfield, MI (US)

( * ) Notice: Subject to any disclaimer, the term of this patent is extended or adjusted under 35 U.S.C. 154(b) by 276 days.

(21) Appl. No.: 18/434,303

(22) Filed: Feb. 6, 2024

(65) Prior Publication Data

US 2025/0251015 A1     Aug. 7, 2025

(51) Int. Cl.
F16C 11/06          (2006.01)

(52) U.S. Cl.
CPC ................................ F16C 11/0642 (2013.01)

(58) Field of Classification Search
CPC ............. F16B 12/40; Y10T 403/32713; Y10T 403/32819; F16F 1/128; F16F 1/32; F16F 2230/14; F16C 11/0671; F16C 11/0647; F16C 11/0642
See application file for complete search history.

(56) References Cited

U.S. PATENT DOCUMENTS

| | | | | |
|---|---|---|---|---|
| 2,739,615 A | * | 3/1956 | Wurzel ................. | F16L 55/115 |
| | | | | 285/321 |
| 3,322,445 A | | 5/1967 | Morris | |

| | | | | |
|---|---|---|---|---|
| 3,401,962 A | * | 9/1968 | Scheublein, Jr. ... | F16C 11/0647 |
| | | | | 403/126 |
| 3,483,888 A | * | 12/1969 | Wurzel ................... | F16K 51/00 |
| | | | | 403/123 |
| 3,539,210 A | * | 11/1970 | Fister .................. | F16C 11/0647 |
| | | | | 403/132 |
| 4,322,175 A | * | 3/1982 | Szczesny ............ | F16C 11/0671 |
| | | | | 277/635 |
| 5,466,084 A | | 11/1995 | Brueggen et al. | |
| 5,649,779 A | * | 7/1997 | Martin ................ | F16C 11/0671 |
| | | | | 277/635 |
| 7,322,769 B2 | | 1/2008 | Heuser et al. | |
| 7,753,611 B2 | * | 7/2010 | Ergodan ................ | B62D 7/166 |
| | | | | 403/138 |
| 7,980,564 B2 | * | 7/2011 | Niwa .................. | F16C 11/0671 |
| | | | | 277/634 |
| 7,985,034 B2 | | 7/2011 | Ruste et al. | |

(Continued)

FOREIGN PATENT DOCUMENTS

| | | | |
|---|---|---|---|
| EP | 0350678 B1 | 7/1993 | |
| KR | 101573397 B1 | 12/2015 | |

*Primary Examiner* — Daniel J Wiley
(74) *Attorney, Agent, or Firm* — Reising Ethington P.C.

(57) ABSTRACT

A socket joint and spring for a socket joint that has a plurality of fingers extending from a radially extending mounting flange. The finger has opposing spring surfaces separated by an edge portion. The edge portion of the finger extends to the radially extending mounting flange, and the finger extending from a junction end at the radially extending mounting flange to a distal end. The finger has an axial shift bend toward the junction end and a load bearing tip toward the distal end. In one implementation, the finger is configured as a flex lever arm extending from a center point of the axial shift bend to the load bearing tip.

16 Claims, 3 Drawing Sheets

(56) References Cited

U.S. PATENT DOCUMENTS

| | | | |
|---|---|---|---|
| 9,429,185 B2 | 8/2016 | Koch | |
| 11,466,727 B2 * | 10/2022 | Auquier | F16C 11/0642 |
| 11,965,581 B2 * | 4/2024 | Bergfeld | F16F 3/023 |
| 2008/0279618 A1 * | 11/2008 | Erdogan | F16C 11/0642 |
| | | | 403/138 |
| 2012/0114412 A1 | 5/2012 | Sokolihs et al. | |

* cited by examiner

SPRING AND SOCKET JOINT

TECHNICAL FIELD

The present disclosure generally relates to vehicle components and, in particular, to springs for socket joints.

BACKGROUND

Having a controlled preload in a socket joint can help provide more reliable performance. However, in some instances, the operable space within the joint may be too confined for solutions such as a Belleville washer or the like. Additionally, it is beneficial for the preload to have a low spring rate, which limits the amount of load change over the range of travel of the spring. While some bearings and/or rachet means exist, these components typically either fail to interact with the stud/ball or perform more of a bearing function as opposed to creating a desired and controllable preload.

SUMMARY

According to one embodiment, there is provided a spring for a socket joint comprising a radially extending mounting flange and a finger extending from the radially extending mounting flange. The finger has opposing spring surfaces separated by an edge portion. The edge portion of the finger extends to the radially extending mounting flange, with the finger extending from a junction end at the radially extending mounting flange to a distal end. The finger has an axial shift bend toward the junction end and a load bearing tip toward the distal end.

In some embodiments, each spring surface has a larger area than the edge portion. The edge portion may have a U-shaped segment. The edge portion may also have a first bend edge segment and a second bend edge segment, where the first bend edge segment and the second bend edge segment join the finger to the radially extending mounting flange at the axial shift bend. A first notch area can be included in the radially extending mounting flange adjacent the first bend edge segment. A second notch area can also be included in the radially extending mounting flange adjacent the second bend edge segment, where the first notch area and the second notch area are symmetrical with respect to a center point of the axial shift bend. In some embodiments, the U-shaped segment extends between the first bend edge segment and the second bend edge segment. A first bend radius may join the U-shaped segment and the first bend edge segment, and a second bend radius may join the U-shaped segment and the second bend edge segment. In some instances, the first bend radius is larger than the second bend radius, and the first bend radius and the second bend radius form a radial extension bend in the finger.

In some embodiments, the finger is configured as a flex lever arm extending from a center point of the axial shift bend to the load bearing tip. The flex lever arm can have a radial component and an axial component, with the radial component being 1.5 times larger or more than the axial component. The axial shift bend may be aligned with an inner diameter of the mounting flange.

In some embodiments, the spring surfaces are an inner spring surface and an outer spring surface, the inner and outer spring surfaces being opposing axially extending surfaces. The inner spring surface can be configured to contact a stud of the socket joint at the load bearing tip.

In some embodiments, the finger is part of a plurality of fingers, with each finger of the plurality of fingers being radially spaced around the radially extending mounting flange.

The spring may be included in a socket joint, where the radially extending mounting flange is seated between a bearing and a backing bearing. The opposing spring surfaces can include an outer spring surface and an inner spring surface, with the outer spring surface contacting the backing bearing at the junction end and the outer spring surface being spaced by a gap from the backing bearing at the distal end.

According to another embodiment, there is provided a spring for a socket joint, comprising a radially extending mounting flange and a finger extending from the radially extending mounting flange to a distal end. The finger has opposing spring surfaces separated by an edge portion. The edge portion of the finger extends to the radially extending mounting flange. The finger is configured as a radially extending flex lever arm along a length of the opposing spring surfaces from the radially extending mounting flange to the distal end of the finger.

According to another embodiment, there is provided a socket joint comprising a stud having a ball end, a backing bearing at least partially surrounding the stud, a bearing at least partially surrounding the ball end of the stud, a housing at least partially surrounding the bearing, and a spring having a mounting flange and a finger. The mounting flange is seated between the bearing and the backing bearing, and a load bearing tip of the finger is configured to contact the ball end of the stud.

Various aspects, embodiments, examples, features and alternatives set forth in the preceding paragraphs, in the claims, and/or in the following description and drawings may be taken independently or in any combination thereof. For example, features disclosed in connection with one embodiment are applicable to all embodiments in the absence of incompatibility of features.

BRIEF DESCRIPTION OF THE DRAWINGS

Preferred example embodiments will hereinafter be described in conjunction with the appended drawings, wherein like designations denote like elements, and wherein.

DETAILED DESCRIPTION

The spring for a socket joint described herein includes one or more spiral wound fingers that curve radially inward from a junction end to a load bearing tip. In an advantageous embodiment, the spring includes multiple fingers that are strategically positioned within the socket joint to help impart a desired preload. In one specific implementation, the combined loading of the fingers results in an approximate load ranging from 200 lbs at minimum deflection to 400 lbs at maximum deflection. Each finger may be configured as a radially extending flex lever arm that helps keep the ball of the socket joint properly seated. This can help with undesirable clacking or clunking of the joint that may be caused by too much axial movement of the ball and stud within the housing.

Figure 1:
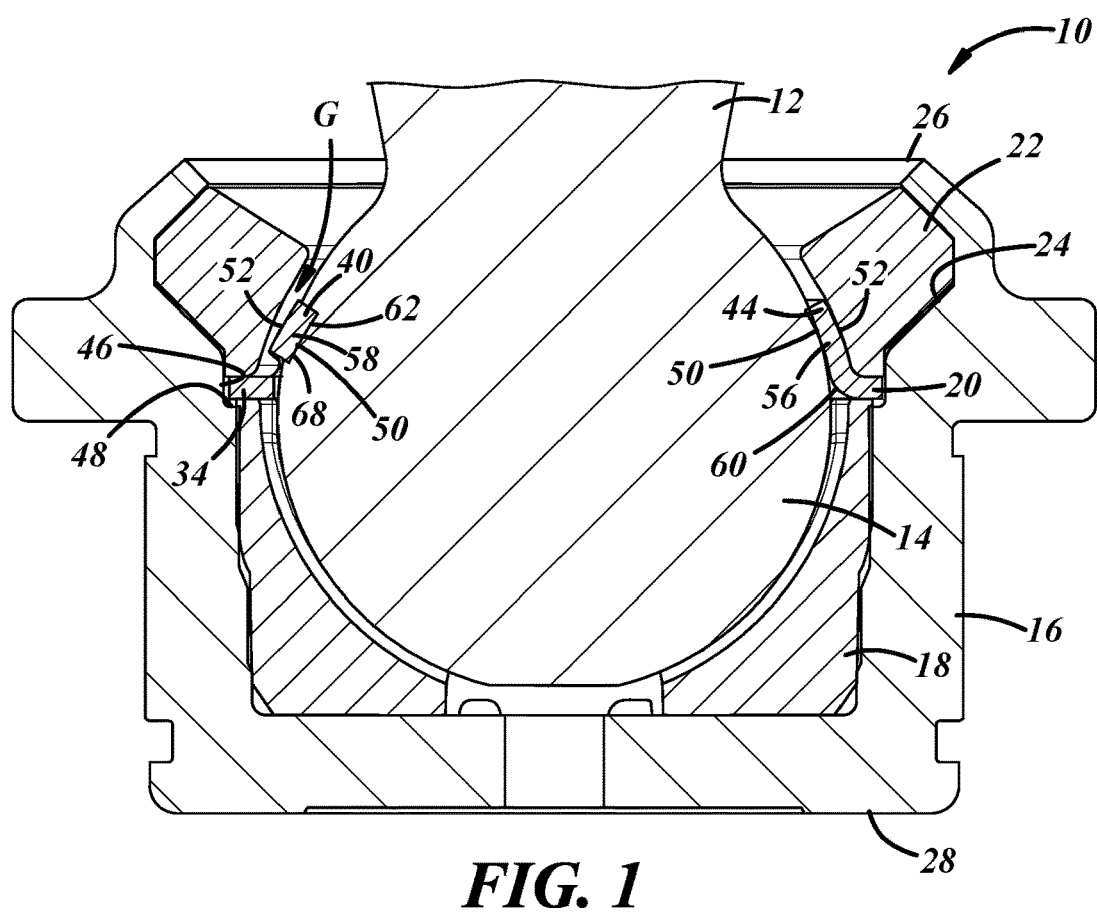
FIG. 1 is a partial, cross-section view of a socket joint having a spring in accordance with one embodiment.
Figure 2:
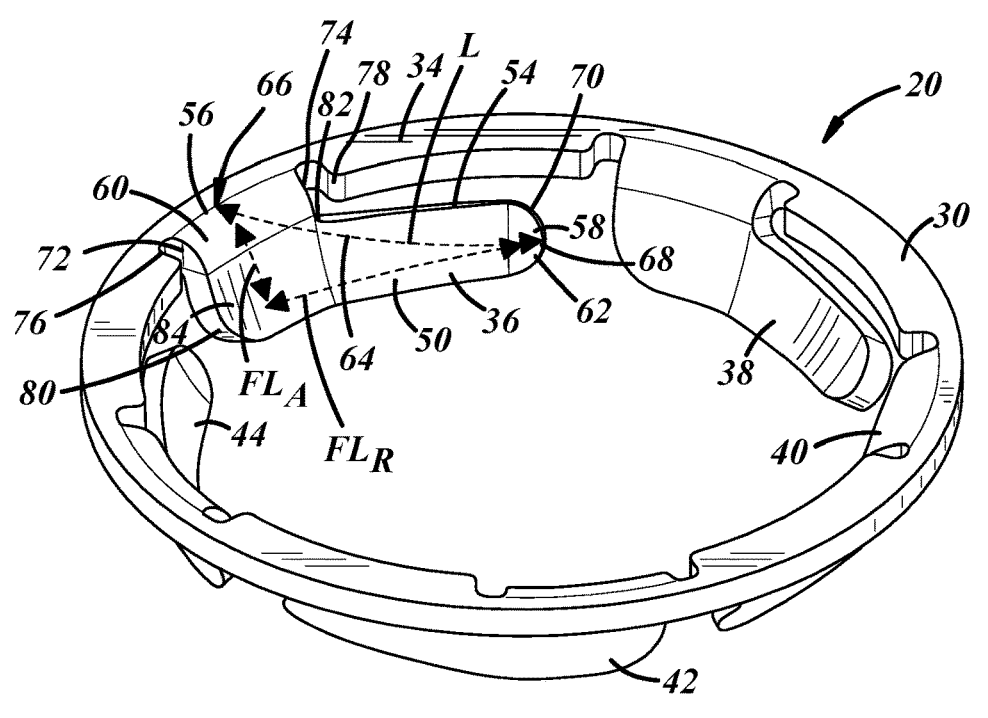
FIG. 2 shows an exit facing side of the spring of FIG. 1.

FIGS. 1 and 2 illustrate one embodiment of a socket joint 10. The socket joint 10 includes a stud 12 which has a ball end 14. A housing 16 generally surrounds a bearing 18, which surrounds the ball end 14 of the stud 12. A spring 20 is situated between the bearing 18 and a backing bearing 22 in this particular implementation. It should be noted, however, that the socket joint 10 may incorporate any moveable socket configuration and is not limited to the explicitly illustrated ball joint shown in the figures and described herein. Additionally, this embodiment advantageously situates the spring 20 between the bearing 18 and the backing bearing 22, but another technically feasible location is certainly possible. The socket joint 10 may also include other features, such as a dust boot or other operational-based features depending on the desired use and placement of the joint within a vehicle steering and suspension system. The joint 10 may be used in various implementations, including as a tie rod end, a connection between a steering knuckle and a control arm, or in another location in the vehicle, preferably a location that does not require high tension loading.

The housing 16 is a generally circular cylindrical component that surrounds the internal components of the joint 10. The housing 16 has an internal bore 24 in which the stud 12, the bearings 18, 22 and the spring 20 are situated. The internal bore 24 houses grease to lubricate the various internal components of the joint 10, and to seal the grease, a dust boot can be used on an exit side 26 of the housing 16 and a grease fitting may be used on an end side 28 of the housing. In some implementations, a separate cover plate and/or one or more additional springs may be included within the internal bore 24 of the housing 16.

Figure 3:
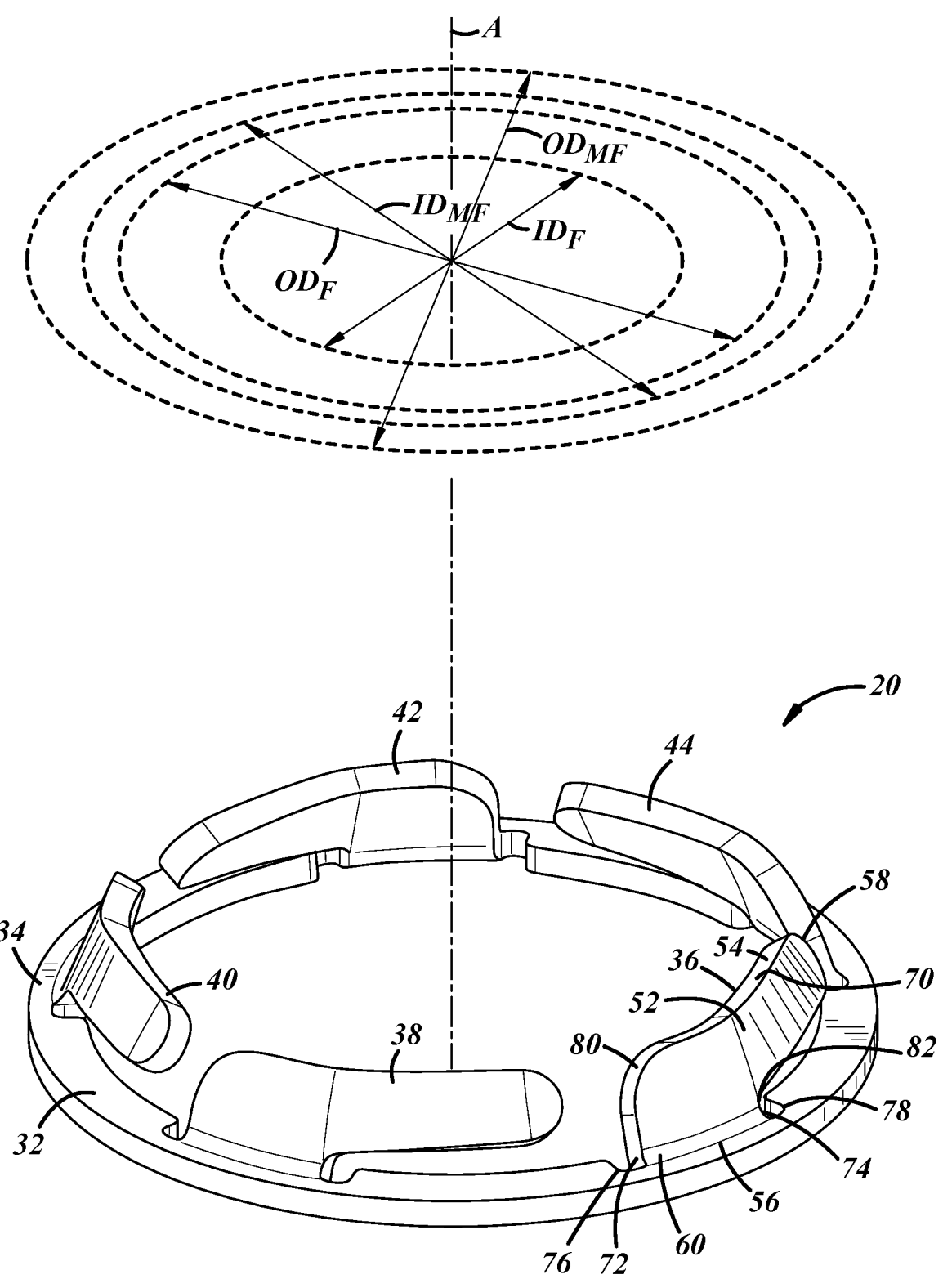
FIG. 3 shows a housing facing side of the spring of FIGS. 1 and 2.

FIGS. 2 and 3 show an end side 30 and an exit side 32 of the spring 20, respectively. The end side 30 of the spring 20 generally faces toward the end side 28 of the housing 16. The exit side 32 of the spring 20 generally faces toward the exit side 26 of the housing 16 (the exit sides 26, 32 being the side at which the stud 12 exits the housing 16). The spring 20 has a radially extending mounting flange 34. A plurality of fingers 36, 38, 40, 42, 44 extend from the radially extending mounting flange 34. As used herein, axial or axially extending means generally parallel to the axis A (+/−5 deg.), and radial or radially extending means generally orthogonal with respect to the axis A (+/−5 deg.). For components, surfaces, etc. that are described as radially or axially extending, only a portion thereof need to be radially or axially extending, respectively.

The radially extending mounting flange 34 helps to seat the spring 20 in place between the end bearing 18 and the backing bearing 22, as shown in FIG. 1. Both the end bearing 18 and the backing bearing 22 are solid bearings that help sandwich the spring 20 in an advantageous place around the ball 14 and within the internal bore 24 of the housing 16. The end bearing 18, toward the exit side 26 of the housing 16, extends to a radial extension 46 in the internal bore 24 of the housing, which provides a seating area 48 that may help with positional retention of the radially extending mounting flange 34 of the spring 20. Additionally, in this embodiment, the mounting flange 34 is fully radially extending around its entirety to help with seating between the bearing 18 and the backing bearing 22.

In the illustrated embodiments, a plurality of fingers 36, 38, 40, 42, 44 extend from the radially extending mounting flange 34. The discussion herein focuses on the finger 36 for clarity purposes, but in this embodiment, is also applicable to all of the other fingers 38, 40, 42, 44. In some embodiments, one or more fingers may have a different configuration than one or more of the other fingers. In one potential example, the finger may have more of a T-shape as opposed to the single extension illustrated. Advantageously, it is preferable to have a plurality of fingers 36, 38, 40, 42, 44 that extend from the radially extending mounting flange 34 (in one desirable embodiment, four or more), but there could be more or less depending on the desired specifications of the joint 10. Additionally, as shown in the figures, the fingers 36, 38, 40, 42, 44 are equally distributed around the inner diameter $ID_{MF}$ of the mounting flange 34. This can help improve load distribution, but it is possible to vary the distribution of the fingers 36, 38, 40, 42, 44 around the inner diameter $ID_{MF}$. FIG. 3 schematically shows the various dimensions of the spring 20, including the inner diameters of the mounting flange and fingers, $ID_{MF}$ and $ID_F$, respectively, as well as the outer diameters of the mounting flange and fingers, $OD_{MF}$ and $OD_F$, respectively.

The finger 36 includes opposing spring surfaces 50, 52 which are separated by an edge portion 54. As opposed to slotted bearings or the like, the edge portion 54 of the finger 36 extends all the way to the radially extending mounting flange 34. This configuration provides a more finger-like structure and can help impart a better compressive or spring-like ability. The finger 36 extends from a junction end 56 at the radially extending mounting flange 34 to a distal end 58. The finger 36 includes an axial shift bend 60 toward the junction end 56 and a load bearing tip 62 toward the distal end 58.

The axial shift bend 60 helps to structurally orient each finger 36 in a more advantageous position to help control the amount of spring force while maintaining adequate torque. With other rachet type components, the lever arm would extend radially outward from the flange and then shift up or down, which does not result in the more radially extending spiral wound configuration of the present embodiments. In the illustrated embodiments, the axial shift bend 60 occurs directly adjacent the radially extending mounting flange 34 in order to shift the opposing spring surfaces 50, 52 such that they are primarily axially extending surfaces, as opposed to being primarily radially extending. More particularly, in this example, the axial shift bend 60 is aligned with the inner diameter of the mounting flange $ID_{MF}$. This arrangement can help with positioning each of the fingers 36-44 in a more accommodating space between the ball end 14 of the stud 12 and the backing bearing 22.

With particular reference to FIG. 2, although applicable to other embodiments as well, the axial shift bend 60 helps to configure the finger 36 as a flex lever arm 64 having a length L extending from a center point 66 of the axial shift bend at the radially extending mounting flange 34 to a center point 68 of the load bearing tip 62 at the distal end 58 (the length L in this embodiment also corresponding to a longest length of the opposing spring surfaces 50, 52 from a center point at each end 56, 58). With the configuration of the flex lever arm 64, most of the force on the finger 36 is in the axial direction, with some radial displacement. The flex lever arm 64 has a partially radially extending, spiral wound configuration that at least partially conforms to the outer diameter of the ball end 14 of the stud 12. The spiral wound shape of the flex lever arm 64 gives a partial axial component $FL_A$, as shown dimensionally in FIG. 2, as well as a predominantly larger radial component $FL_R$. In one embodiment, the radial component $FL_R$ is 1.5 times the length of the axial component $FL_A$, or more (for clarity purposes the components of the flex lever arm 64 are only labeled in FIG. 2 but are applicable to other embodiments as well). This particular arrangement, with the radial component $FL_R$ being 1.5 times the length of the axial component $FL_A$ (or more), helps impart an improved spiral characteristic.

Returning to FIG. 1, each finger 36, 38, 40, 42, 44 has opposing spring surfaces, with an inner spring surface 50 and an outer spring surface 52. When installed within the housing 16 of the joint 10, the inner spring surface 50 and the outer spring surface 52 directly contact both the ball end 14 of the stud 12 and the backing bearing 22 at the junction end 56 of the finger (see e.g., the finger 44 in FIG. 1). The spiral-like flex lever arm 64 then allows for the inner spring surface 50 at the distal end 58 and load bearing tip 62 to directly contact the ball end 14 of the stud 12, but the outer spring surface 52 is spaced from the backing bearing 22, leaving a gap G at the distal end (see e.g., the finger 40 in FIG. 1, with the backing bearing 22 and the ball end 14 having the same radius of curvature and being symmetrical with respect to axis A). In this embodiment, the gap between the backing bearing 22 and the ball end 14 is greater than a width of the edge portion 54 (the thickness between the opposing spring surfaces 50, 52), which allows the spring 20 to flex and create a gap G at the distal end 58 of each finger. This configuration can help impart a desired load range at maximum deflection.

Figures 4, 5, 6:
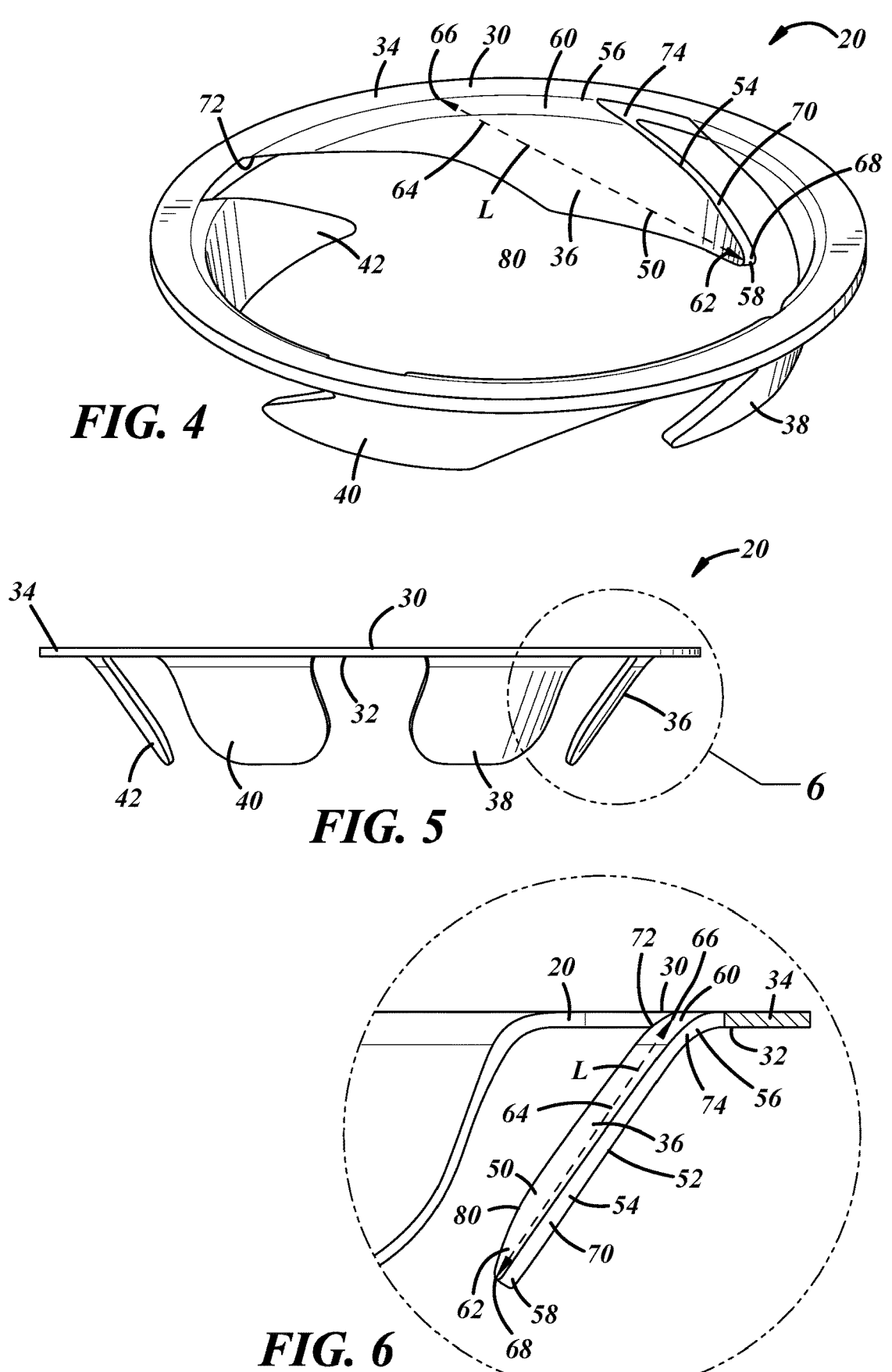
FIG. 4 shows another embodiment of a spring.
FIG. 5 shows yet another embodiment of a spring.
FIG. 6 is partial side view of a finger of the spring of FIG. 5 in accordance with one embodiment.

As shown in the figures, each spring surface 50, 52 has a larger area than the edge portion 54 that separates the surfaces 50, 52. The edge portion 54 extends all the way to the radially extending mounting flange 34 to provide more of a finger-like structure. It should be understood, however, that one or more of the fingers 36, 38, 40, 42, 44 may have an alternate configuration than the examples illustrated. The example shown in FIGS. 1-3 is preferred, but FIGS. 4-6 show alternate examples that may be employed. In yet another example, the finger 36, instead of having a single projection from the axial shift bend 60, may have more projections (e.g., a sort of T-shaped arrangement in one example). Other example configurations are certainly possible. For example, the length of the finger 36 may vary such that it is shorter than what is illustrated, or it may be longer such that it overlaps with another one of the fingers.

The edge portion 54 of the finger 36 includes a U-shaped segment 70. The U-shaped segment 70 has two branches connected at an apex, and that apex may be more rounded (as with the embodiment in FIGS. 1-3 and 5-6, or more angular similar to a V-shape as shown in FIG. 4). This helps provide a more finger-like structure, and in this embodiment, the apex is the center point 68 of the load bearing tip 62. The U-shaped segment 70 may extend between a first bend edge segment 72 and a second bend edge segment 74. The bend edge segments 72, 74 are parts of the edge portion 54 that join the finger 36 to the radially extending mounting flange 34 at the axial shift bend 60. They each have a curvature that helps impart the axial shift transition at the axial shift bend 60.

With reference to the embodiment illustrated in FIGS. 1-3, the bend edge segments 72, 74 of the edge portion 54 join the finger 36 to the radially extending mounting flange 34. In this embodiment, a first notch area 76 is located adjacent the first bend edge segment 72 and a second notch area 78 is located adjacent the second bend edge segment 74. In this particular example, the first notch area 76 and the second notch area 78 are symmetrical with respect to the center point 66 of the axial shift bend 60. These notch areas 76, 78 extend into the inner diameter $ID_{MF}$ of the mounting flange 34 and help to orient the axial shift bend 60 such that it is generally aligned with the $ID_{MF}$. The notch areas 76, 78 can improve the efficiency of the manufacturing process, particularly when the spring 20 is stamped.

Additionally, in the embodiment of FIGS. 1-3, the edge portion 54 has a first bend radius 80 that joins the U-shaped segment 70 and the first bend edge segment 72, as well as a second bend radius 82 that joins the U-shaped segment 70 and the second bend edge segment 74. In this embodiment, the first bend radius 80 is larger than the second bend radius 82 which helps create a radial extension bend 84 in the finger 36. The radial extension bend 84 is equal to about 90°, which is similar to the axial shift bend 60 which is also about 90° in this implementation. Having the first bend radius 80 larger than the second bend radius 82 helps create a sharper radial extension bend 84 while maintaining a more consistent width along a length L of the flex lever arm 64 of the finger 36. The width of each finger 36 is approximately equal to a difference between the inner diameter of the finger $ID_F$ and the outer diameter of the finger $OD_F$ as shown in FIG. 3.

The embodiments of FIGS. 4-6 differ slightly in that they do not have two bend radii connecting the U-shaped segment 70. Instead, one branch of the U-shaped segment 70 extends directly to the bend edge segment 74. While the finger structure of FIGS. 1-3 is preferred, it is possible to have the configuration of FIGS. 4-6, depending on the desired implementation. Again, as previously addressed, the figure construction may vary depending on the characteristics of the spring 20 and the socket joint 10.

It is to be understood that the foregoing is a description of one or more preferred example embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering all the following: "A"; "B"; "C"; "A and B"; "A and C"; "B and C"; and "A, B, and C."

The invention claimed is:

1. A spring for a socket joint, comprising:
a radially extending mounting flange; and
a finger extending from the radially extending mounting flange, the finger having opposing spring surfaces separated by an edge portion, wherein the edge portion of the finger extends to the radially extending mounting flange, the finger extending from a junction end at the radially extending mounting flange to a distal end, wherein the finger has an axial shift bend toward the junction end and a load bearing tip toward the distal end, wherein the edge portion has a U-shaped segment, wherein the edge portion has a first bend edge segment and a second bend edge segment, wherein the first bend edge segment and the second bend edge segment join the finger to the radially extending mounting flange at the axial shift bend, and wherein the U-shaped segment extends between the first bend edge segment and the second bend edge segment.

2. The spring of claim 1, wherein each spring surface has a larger area than the edge portion.

3. The spring of claim 1, further comprising a first notch area in the radially extending mounting flange adjacent the first bend edge segment.

4. The spring of claim 3, further comprising a second notch area in the radially extending mounting flange adjacent the second bend edge segment, wherein the first notch area and the second notch area are symmetrical with respect to a center point of the axial shift bend.

5. The spring of claim 1, wherein a first bend radius joins the U-shaped segment and the first bend edge segment, and a second bend radius joins the U-shaped segment and the second bend edge segment.

6. The spring of claim 5, wherein the first bend radius is larger than the second bend radius.

7. The spring of claim 5, wherein the first bend radius and the second bend radius form a radial extension bend in the finger.

8. The spring of claim 1, wherein the finger is configured as a flex lever arm extending from a center point of the axial shift bend to the load bearing tip.

9. The spring of claim 8, wherein the flex lever arm has a radial component and an axial component, with the radial component being 1.5 times larger or more than the axial component.

10. The spring of claim 1, wherein the axial shift bend is aligned with an inner diameter of the mounting flange.

11. The spring of claim 1, wherein the spring surfaces are an inner spring surface and an outer spring surface, the inner and outer spring surfaces being opposing axially extending surfaces.

12. The spring of claim 11, wherein the inner spring surface is configured to contact a stud of the socket joint at the load bearing tip.

13. The spring of claim 1, wherein the finger is part of a plurality of fingers, with each finger of the plurality of fingers being radially spaced around the radially extending mounting flange.

14. A socket joint comprising the spring of claim 1, wherein the radially extending mounting flange is seated between a bearing and a backing bearing.

15. The socket joint of claim 14, wherein the opposing spring surfaces include an outer spring surface and an inner spring surface, with the outer spring surface contacting the backing bearing at the junction end and the outer spring surface being spaced by a gap from the backing bearing at the distal end.

16. A spring for a socket joint, comprising:
   a radially extending mounting flange; and
   a finger extending from the radially extending mounting flange, the finger having opposing spring surfaces separated by an edge portion, wherein the edge portion of the finger extends to the radially extending mounting flange, the finger extending from a junction end at the radially extending mounting flange to a distal end, wherein the finger has an axial shift bend toward the junction end and a load bearing tip toward the distal end, wherein the radially extending mounting flange is seated between a bearing and a backing bearing.

* * * * *